United States Patent Office 3,454,496
Patented July 8, 1969

3,454,496
LUBRICANT COMPOSITIONS
Roland T. Schlobohm, Bethalto, Ill., and William Jack Glaser, Springfield, Va., assignors to Shell Oil Company, New York, N.Y., a corporation of Delaware
No Drawing. Filed Jan. 17, 1967, Ser. No. 609,786
Int. Cl. C10m 1/32; C08g 9/04
U.S. Cl. 252—32.7
11 Claims

ABSTRACT OF THE DISCLOSURE

Lubricating compositions with improved cleanliness properties are obtained by incorporating therein a minor amount of the reaction product of a polyalkenyl succinimide of polyalkylene amine with formaldehyde and phenol, the adduct of which is then reacted with a metal hydroxide and subsequently carbonated.

---

This invention relates to novel compounds and to lubricating compositions, such as heavy-duty engine oils, containing the novel compounds.

Heavy-duty engine oils must withstand severe and exhaustive service. These oils are used, for example, in diesel engines where high temperatures and fuels of high sulfur content are encountered. Piston lacquer and undercrown deposits in diesel engines resulting from the relatively high temperatures encountered therein have been continuing problems. Although various additives, such as dispersants and anti-oxidants, have been developed to reduce deposits in engines, most of these additives lack the necessary cleanliness, stability and anti-wear properties to be used effectively in heavy-duty motor oils.

It has now been found that the novel compounds of the present invention when incorporated into heavy-duty engine lubricating compositions provide a cleanliness additive which possesses thermal stability, reserve alkalinity and good dispersing properties.

The lubricant additive of the present invention is a carbonated metal phenate-succinimide adduct and is prepared by reacting an imide, formaldehyde and phenol together under adduct-forming conditions. The adduct is then reacted with a metal hydroxide to convert the phenol group of the adduct to a metal phenate group; the adduct is then carbonated. Although the structure of the carbonated adduct is not known with absolute certainty, it is believed to have the following formula:

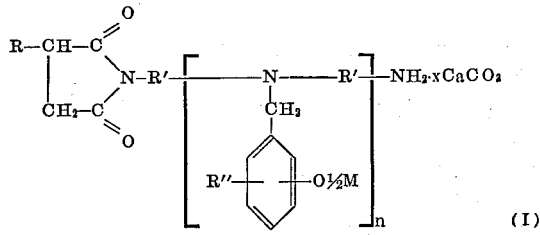

(I)

wherein R is a hydrocarbon radical of from 30 to 200 carbon atoms or more and preferably a branched- or straight-chain aliphatic hydrocarbon radical having from 50 to 150 carbon atoms, such as a polyalkenyl radical, for example, polyisobutenyl, polybutenyl, polypropenyl and the like; R' is a $C_{1-4}$ alkylene radical and preferably —$CH_2CH_2$—; R" is a $C_{4-20}$ alkyl group and preferably a $C_{6-16}$ alkyl group; $n$ is an integer from 1 to 10 and preferably from 1 to 3; $x$ is an integer from 1 to 20; and M is a metal ion such as an alkali or alkaline earth metal, e.g., K, Na, Ca, Ba, Sr, Mg, etc., preferably calcium or barium.

Therefore, in accordance with the preferred embodiments of the invention the compounds may be described as a phenate-succinimide adduct wherein the succinimide is the polyisobutenyl succinimide of polyethyleneamine and when the polyethyleneamine is tetraethylene pentamine, is believed to have the following formula:

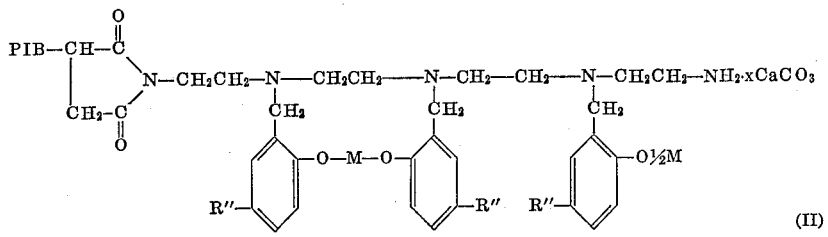

(II)

wherein PIB is polyisobutenyl having a molecular weight of from 300–1500, R" is a $C_{6-16}$ alkyl group, e.g., nonyl, and M is barium or calcium. Specifically preferred compounds are the adducts prepared from formaldehyde, nonylphenol and one of the following succinimides:

(1) the polyisobutenyl succinimide of tetraethylene pentamine (polyisobutenyl MW 850);
(2) the polypropenyl succinimide of tetraethylene pentamine (polypropylenyl MW 500);
(3) the polybutenyl succinimide of tetraethylene pentamine (polybutenyl MW 1000); and
(4) the polyisobutenyl succinimide of triethyl tetramine (polyisobutenyl MW 1000).

The hydroxyl hydrogens of the phenolic groups of the adducts are replaced with calcium atoms by reacting the above adducts with calcium hydroxide to form calcium phenate groups; the resulting phenate-succinimide adducts are subsequently carbonated.

The adduct additive of the present invention may be incorporated into mineral lubricating oil obtained from paraffinic, naphthenic, asphaltic or mixed base crudes and/or mixtures thereof, for example, neutral oils having viscosities which may vary over a wide range such as from 100 to 6,500 SSU at 100° F. Under extreme engine operating conditions it is desirable to use an oil blend containing from 1 to 20% of Bright Stock having a viscosity of from 80 to 250 SSU at 210° F. and range in molecular weight from about 500 to 2,000 or higher. In addition to mineral lubricating oils, the adduct additives may be incorporated into synthetic lubricating oils such as polymerized olefins, esters and ethers. Mixtures of natural and synthetic oils can also be used.

The adduct additive of this invention can be used effectively in any of the above oily media in amounts of from 0.1% to 10% by weight and preferably from 2% to 5% although amounts as large as 20% or as little as 0.01% by weight may be incorporated into the oil if desired.

Other additives may also be incorporated into the lubricating compositions according to the present invention, for example, any of the additives recognized in the art to perform a particular function or functions, i.e., anti-wear agents, such as highly basic alkaline earth metal sulfonates and carbonated metal sulfonates, including the petroleum and synthetic sulfonates; pour depressants and viscosity index improvers, such as methacrylic polymers, e.g., Acryloid 150; dispersants, such as nitrogen-containing compounds, for example, polyisobutenyl succinimide of polyethyleneamine, copolymers of vinyl pyridine and at least one acrylate ester or vinyl pyrrolidone copolymer; antioxidants, such as amines, phosphorus or phenolic compounds, i.e., phenyl-alpha-naphthylamine, zinc dialkyl dithiophosphate, or 4,4'-methylene bis(2,6-di-t-butylphenol); anti-foam agents; corrosion inhibitors; anti-rust agents and the like.

The following examples are given for the purpose of illustrating the invention and are not intended to limit the invention to the particular compounds and compositions described.

EXAMPLE I

This example illustrates the method of preparing the adduct of the present invention:

To prepare the adduct of Formula II wherein M is Ca, 4,500 grams of HVI 100 Neutral Base Stock Oil and 660 grams of nonylphenol (3 moles) were mixed together with 1,500 grams of the polyisobutenyl succinimide of tetraethylene pentamine (1 mole) at 85°–90° C. 243 grams of 37% w. formaldehyde solution (3 moles $CH_2O$) was added dropwise while stirring also at 85°–90° C. After the formaldehyde addition the reaction was stirred for an additional 3 hours at the same temperature and then the water removed from the reaction mixture by heating to 150° C. with nitrogen stripping. The product was cooled below 100° C. and 402 grams of $Ca(OH)_2$ in 540 grams $H_2O$ was added over a period of an hour; stirred for another half an hour; and then the water removed by nitrogen stripping at 160° C. The hot product was filtered through celite filter aid and then carbonated by adding excess $Ca(OH)_2$ to the product in a 60/40 toluene/methanol solvent while bubbling $CO_2$ through the reaction. After carbonation, the product was stripped of toluene, methanol and water and filtered to isolate the overbased calcium tris(nonylphenate) adduct of the polyisobutenyl succinimide of tetrathylene pentamine.

EXAMPLE II

Adducts similar to that of Example I can be prepared by the same technique employed therein only using a different phenol, succinimide and/or hydroxide reactants, such as the overbased calcium tris(nonylphenate) adduct of:

(A) polypropenyl succinimide of tetraethylene pentamine;
(B) polyisobutenyl succinimide of diethylene triamine; or
(C) overbased barium tris(nonylphenate) adduct of polyisobutenyl succinimide of tetraethylene pentamine;
(D) overbased calcium tris(dodecylphenate) adduct of polyisobutenyl succinimide of tetraethylene pentamine; and
(E) overbased calcium pentakis(nonylphenate) adduct of polyisobutenyl succinimide of tetraethylene pentamine;

The Compositions A–J and AA–JJ are illustrative of the invention and Compositions K, L, KK and LL are given for purposes of comparison:

Composition A: Percent
  Adduct of Example I _____ 6.5 (or 0.6 w. SA[1])
  Mineral lubricating oil (SAE 30) _____ Balance
Composition B:
  Adduct of Example II (B) _____ 4.3
  Mineral lubricating oil (SAE 30) _____ Balance

[1] SA represents sulfated ash and is determined by ASTM method D874–46T.

Composition C:
  Adduct of Example II (C) _____ 5.2
  Mineral lubricating oil (SAE 30) _____ Balance
Composition D:
  Adduct of Example I _____ 6.5 (or 0.6 w. SA)
  Zinc bis(octylphenyl)dithiophosphate _____ 3.4
  Mineral lubricating oil (SAE 30) _____ Balance
Composition E:
  Adduct of Example I _____ 6.5 (or 0.6 w. SA)
  Zinc bis(octylphenyl)dithiophosphate _____ 3.4
  4,4'-methylene bis(2,6-di-t-butylphenol) _____ 0.5
  Mineral lubricating oil (SAE 30) _____ Balance
Composition F:
  Adduct of Example I _____ 5.1 (or 0.6 w. SA)
  Zinc bis(octylphenyl)dithiophosphate _____ 3.4
  Mineral lubricating oil (SAE 30) _____ Balance
Composition G:
  Adduct of Example I, SA _____ 1.2
  Zinc bis(octylphenyl)dithiophosphate _____ 3.4
  Basic Ca petroleum sulfate, SA _____ 1.2
  Mineral lubricating oil (SAE 30) _____ Balance Composition H:
  Adduct of Example I, % w. SA _____ 1.2
  Zinc bis(octylphenyl)dithiophosphate _____ 3.4
  Basic Ca petroleum sulfate, % w. SA _____ 1.2
  4,4'-methylene bis(2,6-di-t-butylphenol) _____ 0.5
  Mineral lubricating oil (SAE 30) _____ Balance Composition J:
  Adduct of Example I _____ 5.1 (or 0.6 w. SA)
  Zinc bis(octylphenyl)dithiophosphate _____ 3.4
  Basic Ca petroleum sulfonate __ 7.3 (or 0.6 w. SA)
  Silicone copolymer (anti-foamant) _____ 10 p.p.m.
  Mineral lubricating oil (SAE 30) _____ Balance Composition K:
  Basic Ca petroleum sulfonate __ 24.3 (or 2.0 w. SA)
  Ca salt of the condensation product of
    formaldehyde and octylphenol__3.5 (or 0.2 w. SA)
  Phenyl-alpha-naphthylamine _____ 0.2
  Mineral lubricating oil (SAE 30) _____ Balance Composition L:
  Methacrylic polymer (Acryloid 150) _____ 0.5
  Zinc bis(octylphenyl)dithiophosphate _____ 3.4
  High molecular weight carbonated Ca
    petroleum sulfate, % w. SA _____ 1.2
  Polyisobutenyl succinimide of tetra-
    ethylene pentamine, % w. SA _____ 1.0
  Mineral lubricating oil (SAE 30) _____ Balance Compositions AA through HH and JJ through LL are the same as Compositions A through H and J through L respectively, except that SAE 10 grade oil is used instead of SAE 30.

EXAMPLE III

In this example engine tests were run to determine the effectiveness of oil formulations containing as an additive the adduct of Example I with regards to ring sticking, wear and deposit accumulation.

Composition F was tested in an abbreviated 120-hour Caterpillar L–1 (0.35% w. sulfur fuel) and modified L–1 (1.0% w. sulfur fuel) diesel engine tests. The test engine is the single cylinder, 4 cycle, normally aspirated, 5¾ in. bore, 8 in. stroke, Caterpillar Diesel Lubricant Test Engine. In general, the test conditions are:

Engine speed _____ 1,000 r.p.m.
Fuel rate _____ 2,950 B.t.u./min.
Load, b.m.e.p. _____ Approx. 76 p.s.i.
Air to engine temperature ___ Room (not over 100° F.).
Air to engine pressure _____ Atmospheric.
Water outlet temperature ____ 175° F.
Oil to bearings temperature __ 145° F.
Fuel sulfur content:
  L–1 _____ 0.35% min.
  L–1 modified _____ 1%±0.05%.

The Caterpillar L-1 and L-1 modified are described in detail in Federal Test Method Standard No. 791, Method Nos. 332 and 345-T, respectively.

Composition "F" gave the following acceptable results:

TABLE 1

|  | L-1 | L-1 Modified |
|---|---|---|
| Top Ring Groove Fill, percent | 1.0 | 0.5 |
| Piston Cleanliness number (100=clean) | 99.27 | 98.96 |

In the Caterpillar 1-G Test run for 120 hours Compositions "G" and "H" gave the following acceptable results:

TABLE 2.—120-HOUR 1-G CATERPILLAR ENGINE TESTS

|  | Compositions | |
|---|---|---|
|  | G | H |
| Ring Grooves, Percent Filling: |  |  |
| No. 1 | 19 | 18 |
| No. 2 | 18 BL | 2 LBL. |
|  | 40 LAL | 4 VLAL. |
| Remainder | Clean | Clean. |
| Ring Lands, Percent Covered: |  |  |
| No. 1 | 2 BL | 2 BL. |
|  | 20 LAL | 10 LAL. |
|  | 20 VLAL | 10 VLAL. |
| Nos. 2 and 3 | Clean | Clean. |
| Piston Skirt | do | Do. |
| Piston Undercrown | 90 LBrL | 70 LBrL. |

KEY.—A=Amber; B=Black; L=Lacquer; Br=Brown; V=Very.

EXAMPLE IV

In this example engine tests were run to determine the effectiveness of oil formulations containing as an additive the adduct of Example I with regards to oxidation and bearing corrosion characteristics of the engine oil.

Composition D was tested according to the procedures of the CLR-38 Test and performed satisfactorily. The test uses a CLR or a Labeco Oil Test Engine which is a single cylinder 42.5 cu. in. engine. In general, the test conditions are:

Test duration _____ 40 hrs.
Engine speed _____ 3,150 r.p.m.
Air fuel ratio _____ 14.
Fuel _____ Isooctane+3.0 cc. of TEL.
Oil sump temperature _____ 290° F.
Outlet coolant temperature _____ 200° F.

The test is described in detail in CRC 335, May 1959. The results of the test are given in Table 3.

TABLE 3.—CLR L-38 OXIDATION TEST

|  | Cu-Pb Bearing Weight Loss, mg. | | |
|---|---|---|---|
|  | 40 hours | 80 hours | 120 hours |
| Composition D | 5.8 | 14.5 | 81.0 |

Composition DD was tested and performed satisfactorily in the 1960 Oldsmobile Scuffing Test. The test is based on the Sequence I of the AMA-MS Test and are described in the ASTM special technical publication 315, copyright 1962, under the heading "Reference Sequences I, II, III." The results of this test are given in Table 4.

Table 4
1960 Oldsmobile scuffing test

|  | Scuffed lifters |
|---|---|
| Composition DD | None |

Composition D and Composition L were rust tested in the Falcon Rust Test described in Ghannam's SAE Paper No. 650,869, presented at Tulsa, Okla., Nov. 2–4, 1965 meeting. Both compositions passed the test. It is significant, however, that Composition D which used the adduct of the present invention as the dispersant, viscosity improver, pour point depressant and to obtain alkalinity of the formulation gives anti-rust performance similar to Composition L and yet contains only one-half the ash level of Composition L; ash content of a lubricant is usually indicative of rust protection. The results of the test are given in Table 5.

TABLE 5.—FALCON RUST TESTS

|  | Compositions | |
|---|---|---|
|  | D | L |
| Valve lifters | 9.1 | 9.0 |
| Over-all | 8.8 | 8.9 |

Rust Rating: 10=No rust.

Composition D was evaluated in the CLR Low-Temperature Deposition Test which is required by the MIL-L-2104B specification and is described in detail in the Federal Test Method Standard No. 791 Method 348. Composition D satisfactorily passed this severe specification. The results of the test are given in Table 6.

TABLE 6.—LOW-TEMPERATURE DEPOSITION TEST

|  | MIL-L-2104B Pass Limits | Composition D |
|---|---|---|
| Sludge, merits (50 equal clean) | 35–40 minutes | 48.3 |
| Total Varnish, merits (50 equal clean) |  | 47.0 |
| Piston Skirt Varnish (10 equal clean) | 705 minutes | 7.6 |
| Ring-Slot Clogging, percent | 10–15 maximum | 2.0 |
| Oil-Screen Clogging, percent | do | 1.0 |

The above tests have been conducted to evacuate the additive of the invention. The results of these tests clearly demonstrate that the additive possesses the requisite qualities which are desirable in motor oils, and in heavy-duty motor oils in particular, i.e., cleanliness, stability, reserve alkalinity and good dispersancy.

The compositions described herein can also be used as turbine oils, gear oils, and in various other applications where detergency, stability, and wear inhibition are essential.

We claim as our invention:

1. A composition formed by reacting a polyalkenyl succinimide of polyalkyleneamine with equimolar amounts of formaldehyde and phenol under adduct-forming conditions, reacting the adduct with alkali or alkaline earth metal hydroxide and then carbonating the adduct:
   (1) said succinimide being a mono $C_{30-200}$ alkenyl succinimide of a polyalkylene amine having 3 to 12 amine groups, 1 to 10 of which are secondary amine, and from 1–4 carbon atoms in the alkylene radical;
   (2) the phenol being a mono-substituted alkyl phenol having 6 to 16 carbon atoms in the alkyl group;
   (3) the metal hydroxide being added in the ratio of one equivalent weight metal hydroxide for each equivalent of alkyl phenol; and
   (4) carbonation being effected by bubbling $CO_2$ through the reaction mixture in the presence of excess alkali or alkaline earth metal hydroxide resulting in the addition of from 1–20 alkaline or alkali earth carbonate groups.

2. The composition of claim 1 wherein the polyalkenyl group has 50 to 150 carbon atoms and is selected from the group consisting of polyisobutenyl, polybutenyl, and polypropenyl.

3. The composition of claim 2 wherein the polyalkylene amine is a polyethyleneamine, the metal hydroxide is alkaline earth metal hydroxide, and the polyalkenyl is polyisobutenyl.

4. The composition of claim 3 wherein the monosubstituted alkyl phenol is nonyl phenol.

5. A lubricating composition consisting essentially of a major amount of lubricating oil and a minor amount, sufficient to impart dispersancy, of the reaction product defined in claim 1.

6. The lubricant composition of claim 5 wherein the polyalkenyl in the reaction product is polyisobutenyl, the polyalkylene amine is a polyethylene amine, and the metal hydroxide is an alkaline earth metal hydroxide.

7. The lubricant composition of claim 6 wherein the alkyl phenol in the reaction product is nonyl phenol and the polyethylene amine is tetraethylene pentamine.

8. A composition as defined in claim 5 which also contains an anti-oxidant.

9. A composition as defined in claim 8 wherein the anti-oxidant is a zinc dialkyl dithiophosphate.

10. A composition as defined in claim 8 wherein the anti-oxidant is a phenolic compound.

11. A composition as defined in claim 10 wherein the compound is 4,4'-methylene bis(2,6-di-t-butylphenol).

References Cited

UNITED STATES PATENTS

| | | | |
|---|---|---|---|
| 3,163,603 | 12/1964 | Le Suer | 252—33.6 |
| 3,306,908 | 2/1967 | Le Suer. | |
| 3,342,733 | 9/1967 | Robbins et al. | |
| 3,357,920 | 12/1967 | Nacson. | |

DANIEL E. WYMAN, *Primary Examiner.*

W. J. SHINE, *Assistant Examiner.*

U.S. Cl. X.R.

252—42.7, 51.5; 260—326.5